April 2, 1929.  L. BLACKMORE  1,707,752
ASH EJECTOR TUBE
Filed Sept. 3, 1927
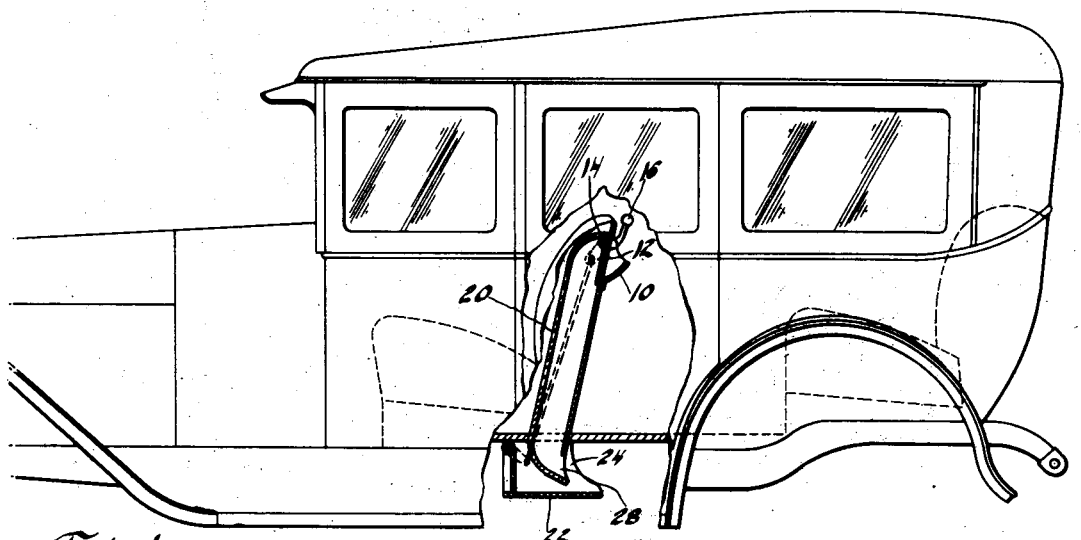
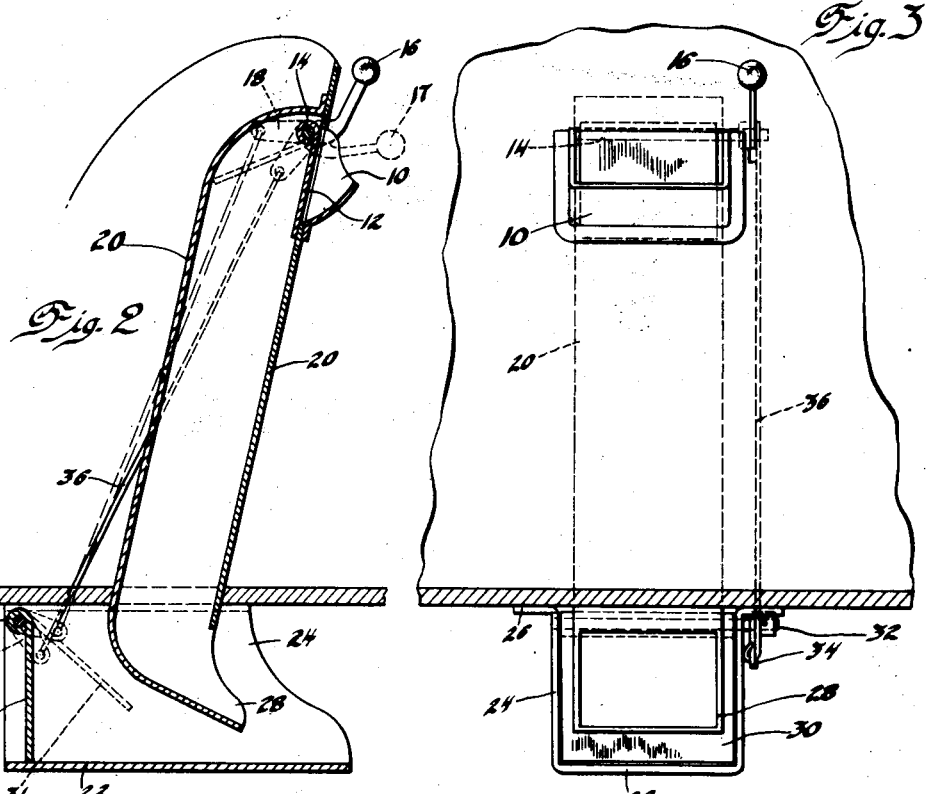
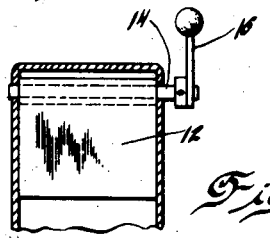
Inventor
Lloyd Blackmore Patented Apr. 2, 1929.

1,707,752

UNITED STATES PATENT OFFICE.

LLOYD BLACKMORE, OF HIGHLAND PARK, MICHIGAN.

ASH-EJECTOR TUBE.

Application filed September 3, 1927. Serial No. 217,524.

The present invention relates to a refuse chute for use with motor vehicles, and is particularly designed for use with motor vehicles of the closed type.

It is an object of the present invention to provide a refuse tray and a refuse removing device which will permit ready disposal of cigar and cigarette ashes or burnt matches by occupants of the car without the necessity of opening a window or door. It is a further object of the invention to provide a device which will retain the ashes, burnt matches or possibly lighted matches or material while in the garage or while the car is standing still and will dispose of them only while on the open road, and this without any attention on the part of the operator.

Other objects and advantages of the invention will appear in the course of the following description, taken in connection with the accompanying drawing and appended claims.

In the drawing:

Figure 1 is a side view, with parts broken away, of a conventional automobile body embodying my invention.

Figure 2 is an enlarged view of the device for disposing of the ashes.

Figure 3 is a rear view of the structure shown in Figure 2.

Figure 4 is a detail view of the trap door and its operating means.

Referring to the drawing, I have illustrated in Figure 1 the body of a conventional closed automobile. Mounted on the back side of the front seat is a receiving tray or pocket 10, the back side of which comprises a trap door 12 mounted on a shaft 14 which has fixed thereto an operating handle 16 provided with a rearwardly extending arm 18. The trap door 16 opens into a substantially vertical casing or chute 20 which extends beneath the floor of the automobile. A retaining shelf or cowl is mounted beneath the floor and comprises a horizontal portion 22 and side portions 24 provided with flanges 26 abutting against and fixed to the under side of the floor by means of screws. The inner portion of the chute 20 extends down between the side portions 24 of the platform and opens rearwardly, as shown at 28.

A door or flap 30 is provided on the front end of the cowl and is supported on a shaft 32 extending transversely of the platform and journalled in bearings in the side portions 24. An arm 34 is fixed to the shaft 32 and is connected to the arm 18 on the upper shaft 14 by means of the rod 36.

The operation of the device will now be described. When it is desired to dump the ashes or other material placed in the tray 10 the operator moves the lever 16 downward, thus moving the trap door 12 rearward and permitting the ashes to fall down the chute 20 onto the cowl 22. Movement of the handle 16 is transmitted through the rod 36 to the door 30, the movement of the handle 16 from its full line position down to dotted line position 17 being accompanied by movement of the door 30 from its full line position to dotted line position 31. If the ashes are dumped when the automobile is stationary, movement of the door 30 has no particular effect. If the ashes are dumped, however, when the automobile is moving, opening of the door 30 permits a draft to pass through the cowl 22, thus removing all the ashes.

I have thus designed an ash ejecting device which will dissipate the ashes while out on the road, but which will not dump the ashes while in a garage or when stationary where there may be a fire hazard. While I have illustrated my device as mounted convenient to the occupants of the rear seat, I desire it to be understood that it can just as readily be mounted convenient to the occupants of a front seat or in a side wall if desired.

I claim:

1. In a motor vehicle, a receptacle, a cowl, a flap movable to permit the passage of air through said cowl when the vehicle is moving, means for opening said receptacle to permit ashes or other refuse to fall on said cowl, and means operated by the opening of said receptacle for moving said flap.

2. In a vehicle, a receptacle, a closure in the lower part thereof, a cowl, a flap movable to permit the passage of air through said cowl when the vehicle is moving, means for opening said closure to permit the contents thereof to fall on said cowl, and means operated by the opening of said closure for moving said flap.

3. In a vehicle body, a receptacle, a cowl, means for causing the contents of the receptacle to fall from said receptacle onto said cowl, a flap adjacent said cowl, and manually operated means for opening said flap from the interior of the body for permitting a draft to flow across the cowl to remove material deposited on said cowl.

4. In a vehicle body, a chute open at its upper end for receiving waste, a shelf beneath said chute for receiving waste from said chute, a member shielding said shelf and movable to permit the draft created by movement of the vehicle to remove said waste, and means operated from within the body for moving said member.

5. In a vehicle, a waste receptacle, a chute leading therefrom mounted in the frame of the vehicle and extending beneath the floor thereof, a valve controlling communication between the receptacle and chute, a shelf beneath the chute for receiving waste therefrom, a member shielding said shelf and movable to permit the draft created by movement of the vehicle to remove said waste, and operating means common to said member and valve.

6. In a vehicle, an opening for receiving waste material, a normally closed cowl for receiving waste material placed in said opening, and manually operable means for permitting the draft created by movement of the vehicle to remove said waste.

7. In a motor vehicle, the combination of a pair of refuse traps, one located inside and the other outside the vehicle body, a passageway connecting the traps, a closure for one of the traps which when opened permits refuse to drop through the passageway by gravity, and a closure for the other trap, which when opened allows the refuse in said trap to be blown out by air currents flowing through the trap.

8. In a motor vehicle body, a refuse receptacle located inside the body, having a closure door leading to an outlet, through which refuse deposited in the receptacle falls by gravity when the door is opened, a trap associated with said outlet to receive the gravitated refuse and from which the refuse is carried out by air current flowing therethrough and means to close the trap against the entrance of air currents.

9. In a motor vehicle body, a refuse receptacle located within the body, a trap for receiving refuse deposited in said receptacle, located outside the body, and from which the refuse is to be carried out by air draft therethrough and means to close said trap against flow of air operated from within the vehicle body.

In testimony whereof I affix my signature.

LLOYD BLACKMORE.